United States Patent [19]

Kumar

[11] Patent Number: 4,711,645

[45] Date of Patent: Dec. 8, 1987

[54] REMOVAL OF WATER AND CARBON DIOXIDE FROM ATMOSPHERIC AIR

[75] Inventor: Ravi Kumar, Allentown, Pa.

[73] Assignee: Air Products and Chemicals, Inc., Allentown, Pa.

[21] Appl. No.: 828,008

[22] Filed: Feb. 10, 1986

[51] Int. Cl.[4] ............................................. B01D 53/04
[52] U.S. Cl. ...................................... 55/26; 55/31; 55/33; 55/62; 55/68; 55/74; 55/75
[58] Field of Search .................. 55/25, 26, 31, 33, 35, 55/58, 62, 68, 74, 75

[56] References Cited

U.S. PATENT DOCUMENTS

| | | | |
|---|---|---|---|
| 2,910,139 | 10/1959 | Matyear, Jr. | 55/31 X |
| 3,102,013 | 8/1963 | Skarstrom | 55/31 |
| 3,150,942 | 9/1964 | Vasan | 55/31 |
| 3,237,379 | 3/1966 | Kant et al. | 55/62 X |
| 3,533,221 | 10/1970 | Tamura | 55/33 |
| 3,594,984 | 7/1971 | Toyama et al. | 55/33 |
| 3,710,547 | 1/1973 | Nelson | 55/62 X |
| 3,719,025 | 3/1973 | Heinze et al. | 55/31 |
| 3,738,084 | 6/1973 | Simonet et al. | 55/31 |
| 3,796,022 | 3/1974 | Simonet et al. | 55/25 |
| 3,841,058 | 10/1974 | Templeman | 55/33 |
| 3,884,661 | 5/1975 | Simonet | 55/62 |
| 3,957,463 | 5/1976 | Drissel et al. | 55/25 |
| 3,981,698 | 9/1976 | Leppard | 55/31 |
| 4,013,429 | 3/1977 | Sircar et al. | 55/33 |
| 4,042,349 | 8/1977 | Baudouin et al. | 55/25 |
| 4,233,038 | 11/1980 | Tao | 55/33 |
| 4,249,915 | 2/1981 | Sircar et al. | 55/62 X |
| 4,326,858 | 4/1982 | Benkmann | 55/31 X |
| 4,329,158 | 5/1982 | Sircar | 55/33 X |
| 4,472,178 | 9/1984 | Kumar et al. | 55/62 X |

FOREIGN PATENT DOCUMENTS

| | | | |
|---|---|---|---|
| 2130897 | 11/1972 | France | 55/33 |
| 137026 | 10/1980 | Japan | 55/33 |
| 972284 | 10/1964 | United Kingdom | 55/31 |
| 2055609 | 3/1981 | United Kingdom | 55/31 |

Primary Examiner—Robert Spitzer
Attorney, Agent, or Firm—Thomas G. Ryder; J. C. Simmons; E. E. Innis

[57] ABSTRACT

Reduction in energy consumption is had in a system for adsorptive removal of moisture and $CO_2$ from atmospheric air by passing the feed air through consecutive beds of adsorbent comprising first alumina then molecular sieve zeolite, at near ambient temperature during adsorption of these impurities and subsequent regeneration of the sorbent laden beds by pressure reduction to about atmospheric level and purge at that level with product gas freed of water and $CO_2$.

7 Claims, 1 Drawing Figure

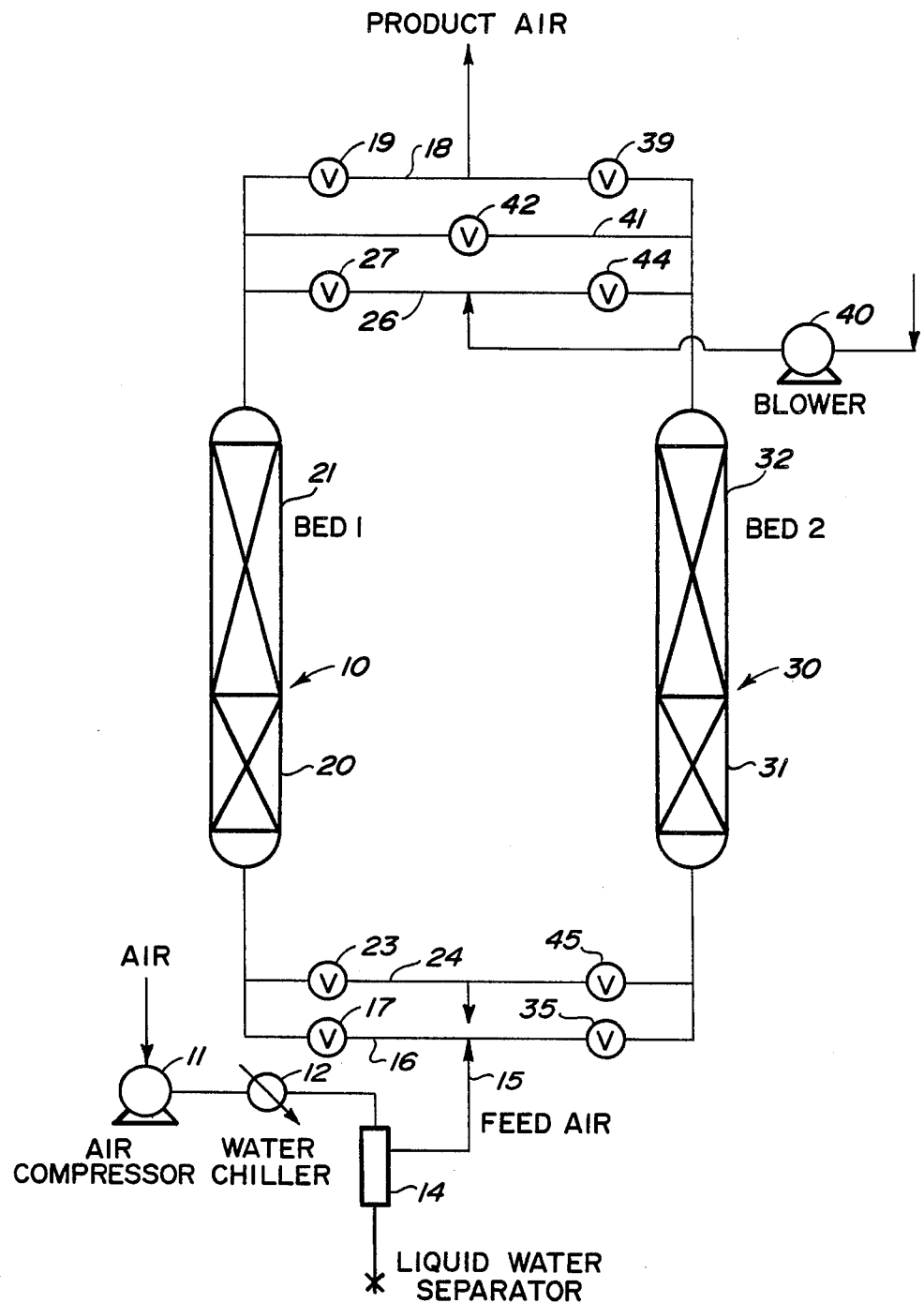

REMOVAL OF WATER AND CARBON DIOXIDE FROM ATMOSPHERIC AIR

FIELD OF THE INVENTION

The present invention relates to the removal of water and carbon dioxide from atmospheric air by selective adsorption in a cyclic system operated in the pressure swing mode (PSA).

BACKGROUND OF THE INVENTION

The removal of water and $CO_2$ from air by selective adsorption of these prior to fractionation of the air into its major components ($O_2$ and $N_2$) by either cryogenic or non-cryogenic separation is well known. When the adsorbent bed or beds become laden with sorbed water and $CO_2$, the adsorbent is regenerated. Such adsorption of contaminants and regeneration of the adsorbent may be carried out by various known techniques which may be characterized as employing either temperature swing adsorption (TSA) or pressure swing adsorption (PSA). In the TSA mode of operation the atmospheric air to be treated is generally cooled down to below room temperature (as to about 40° F. or 4°–5° C.) before being passed through the adsorbent bed(s) for removal of water and $CO_2$. The adsorbent bed(s) is regenerated by passing a hot purge gas therethrough followed by cooling to ready the same for subsequent repeated use. Since the feed air is initially refrigerated and the adsorbent subsequently subjected to thermal regeneration, this mode of operation is energy intensive.

In non-cryogenic air separation plants, such as those employing the molten salt processes, the clear air obtained by pretreatment has to be reheated for further processing, which makes the use of TSA operation for the front end clean-up of the air rather expensive. In large cryogenic plants for air fractionation the overall energy consumption of the TSA operation can be reduced by utilization of systems for recovery of heat of compression of the air feed and recovery of refrigeration values from waste gas. The use of such recovery systems in small cryogenic plants is not justifiable because of associated capital costs. Accordingly, in such instances the energy consumption, of a TSA process is further increased.

Systems operating in the pressure swing mode (PSA) regeneration of adsorbent beds used in removal of moisture and $CO_2$ from the feed air generally rely on vacuum application to rid the adsorbent of residually contained sorbate, some of these PSA operations may also cool the feed air to below room temperature before charging the same to the water/$CO_2$ removal step.

PRIOR ART

The utilization of a pretreating section for removal of water and $CO_2$ from air or other charge gas prior to subjecting the thus cleaned gas to adsorptive fractionation is described in a number of U.S. patents, using either thermal regeneration of the pretreating section adsorbent or desorption by reduction of pressure to sub-atmospheric pressure level.

In U.S. Pat. No. 3,533,221 regeneration of the $CO_2$/$H_2O$ adsorption column is effected by vacuum desorption for a number of short operating cycles. When the pretreat column has lost its adsorption power as a result of the accumulation therein of residual water and $CO_2$, the column is taken off-stream and thermally regenerated.

Typical PSA systems for fractionation of air by adsorption employing an associated pretreat section for adsorptive removal of moisture and $CO_2$ from the atmospheric air charged, are disclosed in U.S. Pat. Nos.: 3,796,022; 3,957,463; and 4,013,429. The air to be treated is introduced into the moisture-$CO_2$ adsorber column at about ambient temperature and at about atmospheric pressure (or somewhat above). Regeneration of the column is subsequently carried out by vacuum desorption.

U.S. Pat. No. 4,042,349 discloses among other described embodiments a system comprising a PSA section for pretreatment of atmospheric air for removal of contained moisture and $CO_2$ prior to fractionation of the thus purified air. The feed air is compressed and cooled in a refrigerant condensor prior to contact with adsorbent. Separate adsorbent beds are employed in series for removal of the water and $CO_2$ respectively. Regeneration of the water-laden and $CO_2$-laden beds is effected by desorption at sub-atmospheric pressure. Alumina is employed for water adsorption and molecular sieve for adsorption of $CO_2$. In described embodiments directed to purification of hydrogen, desorption of the sorbate-laden impurities is effected by elution without use of vacuum.

U.S. Pat. No. 4,249,915 and U.S. Pat. No. 4,472,178 describe a method for removal of moisture and $CO_2$ from atmospheric air, said to be of particular advantage for pretreatment of air prior to cryogenic distillation for oxygen-nitrogen separation. Moisture and $CO_2$ are adsorbed in separate beds respectively. The moisture-laden bed is regenerated in the PSA mode during a relatively short operating cycle while the $CO_2$-laden bed is thermally regenerated at considerably longer time intervals.

All of the foregoing systems, whether operating for water and $CO_2$ removal from air by the TSA mode, the PSA mode or combinations of the two, require input of energy for heating and/or refrigeration, or for vacuum desorption of the sorbent-laden bed or beds. Modifications of prior art methods have been more recently proposed in attempt to effect savings in energy requirements or otherwise to improve efficiency of operation of systems for removing moisture and carbon dioxide from atmospheric air.

Japanese Patent Publication No. Sho 55-27034 discloses an air separation system having a pretreat section for removal of moisture and $CO_2$ from the feed air. The pretreat section has three adsorbent columns, two of which are operated at a time in PSA mode while the third is being thermally regenerated. After thermal regeneration of the third column it is switched to on-stream adsorption substituting for one of the other two columns. As is conventional in TSA systems for moisture and $CO_2$ removal from air, the initial feed air in the method of the patent publication is charged to the on-stream PSA column at about 5° C. (41° F.) at a pressure of 5 kg/cm$^2$ (about 5 bars).

Japanese Patent Publication No. Sho 55-95079 discloses a PSA pretreating system for removal of moisture and $CO_2$ from air to be fed to a rectifier for cryogenic fractionation. Desorption of the $H_2O$—$CO_2$ laden bed is carried out in two steps, first with the purified product air at lower pressure than that employed during the adsorption step, followed by further desorption at reduced pressure using impure nitrogen product from the rectifier operation. About 40% of the initial feed air is used in purging the sorbent-latent bed.

Japanese Patent Publication No. Sho 57-99316 features a PSA method for removal of water and $CO_2$ from compressed air in which the temperature of the feed air and that of the purified product air used in regeneration of the sorbent-laden bed are made almost equal (about 90° F.) by heat exchange between the two streams. While adsorption is at a high pressure of about 240 psia, the desorption (regeneration) is carried out with low pressure product gas preferably under vacuum or by use of an expansion turbine.

In the Published German Patent Application No. DE30 45 451 A1 a PSA system for removal of moisture and $CO_2$ from air is disclosed using two consecutive beds. The air feed is passed first through a bed of synthetic zeolite removing most of the water and $CO_2$ and next through a bed of alumina to remove the small amount of remaining moisture and $CO_2$. The raw air is charged at a pressure of about 114 psia (8 kg/cm$^2$G) and desorption of the sorbent-laden beds effected at atmospheric pressure.

The principles of pressure swing adsorption processes, in general, are discussed by Skarstrom, C. W. in Recent Development in Separation Science, vol. 2, pp. 95-106 (CRC Press, Cleveland, Ohio). Computer studies in connection with theoretical analyses of PSA operation and basic mathematical equations developed, are reported by Chihara, K., et al. in J. Chem. Eng. Japan 16(1) 1983 at pages 53-60.

SUMMARY OF THE INVENTION

In accordance with the present invention an overall reduction in energy consumption is achieved in a PSA system employed for removal of water and $CO_2$ from atmospheric air by use of consecutive beds of adsorbent, under conditions taking advantage of the most desirable properties of each bed. In practice of the invention the feed air is first passed through a bed of alumina which is primarily selective in removal of water contained in the feed and then through a bed of zeolite which removes the $CO_2$ and any residual water. Because the heat of adsorption of water in alumina is much less than that of water in zeolite there is a lower overall temperature rise in the initial water removal step than that had in a process employing a single bed of zeolite for removal of water and $CO_2$. Thus, a more effective and efficient operation is provided by the process of the invention because of the higher adsorption capacity of the zeolite at the lower adsorption temperature of the bed.

BRIEF DESCRIPTION OF THE DRAWINGS

FIG. 1 of the accompanying drawing is a schematic flow diagram of an embodiment in which the process of the invention may be practiced.

DETAILED DESCRIPTION

In practice of the invention apparatus of the general type used in PSA systems for removal of moisture and $CO_2$ from air may be utilized. Thus, as shown in FIG. 1, the system may comprise two columns 10 and 30 operated in alternating sequence in known manner to undergo the following steps:

(1) Adsorption
(2) Depressurization
(3) Purge
(4) Pressurization (1) The air feed to be purified is compressed at 11 and aftercooled in a water chiller 12, any water thereby condensed being removed in liquid separator 14. The thus treated air is charged via line 15 and feed manifold 16 into a selected one of columns 10 or 30 then on the adsorption stage of the operating cycle sequence. Assuming column 10 is then on stream and at designated adsorption pressure, the air is charged into column 10 through open valve 17, passing through that column into discharge manifold 18 via open valve 19.

As shown in the drawing, column 10 contains two separate beds of adsorbent: a first bed 20 comprised of alumina selective for retention of water as opposed to $CO_2$ and a next bed 21 of molecular sieve zeolite capable of adsorbing both $CO_2$ and water from a gas stream such as air. Thus, in passing through column 10 the feed air discharged into line 18 is essentially freed of water and $CO_2$.

After a preset period on the described adsorption step valves 17 and 19 are closed and the admission of feed air is switched to companion column 30 by opening valve 35 in manifold 16 and valve 39 in discharge manifold 18. The feed gas thus is passed consecutively through beds 31 and 32 in column 30, corresponding in adsorbent composition respectively to that of beds 20 and 21 in column 10.

During the time that column 10 was on the described adsorption stroke the adsorbent beds in column 30 were being regenerated in a sequence now to be applied to the beds 20 and 21 in column 10 which contain the water and $CO_2$ sorbed therein. (2) Column 10 is depressured by venting that column, in a direction counter to feed flow, to about atmospheric pressure level by opening valve 23 discharging to the atmosphere, through line 24, thus removing unadsorbed gas and possibly some of the sorbed gas therefrom. Following the depressurizing step column 10 is (3) purged by admission therein of a gas stream essentially free of water and $CO_2$, passed through beds 21 and 20 in a direction counter to that of initial feed gas flow. The purge gas, which may be part of the product gas earlier discharged into manifold 18 or part of the product or waste gas generated in a plant downstream of the described adsorptive unit, is passed through blower 40 into line 26, entering column 10 through open valve 27. The desorbed gas from beds 21 and 20 leaves column 10 through open valve 23 and line 24. The purging of column 10 is continued for a predetermined cycle time or until the water and $CO_2$ level in the effluent reaches a preset limit.

At the termination of the purging step valves 23 and 27 are closed and column 10 is brought back to adsorption pressure level (4) by introduction of product gas free of water and $CO_2$. During the repressurizing of column 10 column 30 is on the adsorption stroke (1) discharging the cleaned air through open valve 39. For the pressuring of column 10, part of the clean product gas being discharged from column 30 is withdrawn through line 41 and open valve 42 into column 10, in a direction counter to that of feed gas flow during the adsorption step. Pressuring of column 10 is continued until that column is brought to the adsorption pressure level, at which time it is ready to undergo a new cycle starting with step (1).

Column 30 in turn goes through the same sequence of steps as column 10, corresponding valves associated with column 30 being opened and closed for admission and discharge of gas.

The operation of the complete cycle sequence utilizing the features of the present invention may be that heretofore employed in PSA systems for removal of water and CO$_2$ from atmospheric air. In a system employing two columns operated in alternating sequence, the time that one of the columns is on the adsorption stroke the companion column undergoes in sequence (2) depressuring, (3) purge and (4) repressuring. Table 1 below illustrates an operation of the process sequence during a complete 20 minute cycle and the valve positions during such cycle.

TABLE 1

| Time (Min) | Col 10 | Col 30 | \multicolumn{9}{c}{VALVE POSITION} |
|---|---|---|---|---|---|---|---|---|---|---|---|
| | | | 17 | 19 | 23 | 27 | 35 | 39 | 42 | 44 | 45 |
| 0-2 | A | D | O | O | C | C | C | C | C | C | O |
| 2-8 | A | P | O | O | C | C | C | C | C | O | O |
| 8-10 | A | RP | O | O | C | C | C | C | O | C | C |
| 10-12 | D | A | C | C | O | C | O | C | C | C | C |
| 12-18 | P | A | C | C | O | O | O | C | C | C | C |
| 18-20 | RP | A | C | C | C | C | O | O | O | C | C |

A: Adsorption
O = Open
D: Depressurization
C = Closed
P: Purge
RP: Repressurization It will be understood that the practice of the invention is not limited to use of a 20 minute cycle nor to PSA systems having two adsorption columns. Moreover, instead of a single column (such as 10 or 30) housing two adsorbent beds, these beds may be contained in a train of separate column in direct flow communication.

The adsorption step is carried out at superatmospheric pressure of about 50 to 150 psia and at near ambient air introduction temperature or somewhat above, as in the range of about 70°-120° F. During the depressurization step the column is brought to about atmospheric level or somewhat above as to about 15 psia at which pressure level the purge step (3) is performed employing purge gas in the range of about 70°-120° F.

EXAMPLE

Atmospheric air which is saturated with water and having an atmospheric level of CO$_2$ (about 350 ppm), is compressed to about 100 psia followed by cooling in the water chiller to about 100° F. and removal of condensate. The compressed air feed is introduced into an adsorption column which has previously been pressurized to about 100 psia and passed serially through a bed of activated alumina followed by a bed of molecular sieve zeolite such as NaX, CaA, Na-mordenite, etc. The adsorption step is continued for a predetermined fixed time period during which the water and carbon dioxide level in the effluent is less than 1 ppm. At this point the air feed is transferred to the companion column. The sorbent laden column is depressed to about 15 psia and purged with recycled product gas from which water and carbon dioxide has been depleted and thereafter repressured with the product or "waste" gas to adsorption pressure level for repetition of the cycle.

While alumina is preferred for initial adsorption of water in beds 20 and 31, any adsorbents may be employed which can selectively remove water from a gas such as air. The selected adsorbent should be one having high working capacity under PSA operating conditions, a low heat of adsorption and fast adsorption kinetics. These characteristics are met by silica gel as well as by alumina.

The adsorbent employed in the beds 21 and 32 for selective removal of CO$_2$ should have a high adsorbent capacity for dilute CO$_2$, low heat of adsorption, and fast adsorption kinetics. Typical adsorbents meeting these criteria include: 5A, 13X and calcium X zeolites. Other zeolites which may be employed include sodium mordenite and other ion-exchanged mordenites.

The beneficial advantages obtained by the present invention will be appreciated by comparing the energy requirements with those of typical TSA and PSA processes, as set out in Table 2. The three compared designs are for systems operated in the designated mode at a common pressure of 100 psia in a plant having a capacity of 170 ST O$_2$/day. Typical TSA and PSA systems operate at feed air temperature of about 40° F. The compared example in accordance with the present invention is based on an air feed temperature of 100° F. and a cycle time of twenty minutes. In the operation according to the invention 45% of the feed is used as purge gas, which is comparable with 40% purge gas requirement for typical prior PSA operations. It will be seen from the data in Table 2 that the present invention reduces the energy requirement by about 34–67% as compared with the typical TSA process and by about 34% as compared with the typical PSA process. Capital cost and unit reliability are also improved by eliminating equipment for refrigeration and heat recovery.

TABLE 2

| | TSA | PSA[3] | Present Invention |
|---|---|---|---|
| Adsorbent | Zeolite | Zeolite | Alumina plus Zeolite |
| t (ads) | 8 hrs. | 30 min. | 10 min. |
| T (ads) °F. | 40 | 40 | 100 |
| T (des) °F. | 300 | 40 | 100 |
| Purge, (% feed) | 7.5 | 40 | 44.4 |
| \multicolumn{4}{c}{Energy Requirement (BTU/hr × 10$^{-6}$)} | | | |
| Q (ref) | 0.35 | 0.35 | 0 |
| Q* (regn) | 0.06[1] 0.15[2] | 0 | 0 |
| Void loss | 0 | 0.02 | 0.06 |
| Blower | 0 | 0.04 | 0.21 |
| Σ = | 0.41[1], 0.50[2] | 0.41 | 0.27 |

Q* (regn) is for thermal pulse regeneration
[1] With heat recovery from air compressor
[2] Without heat recovery from air compressor
[3] Based on examples from Jap. Pat. Pub. #55-95079

Water sorption on a zeolite forms a Type II system which is described by the formation of a pure thermal wave. This wave moves much faster than the water sorption front. The temperature rise in this thermal front is given by (Sircar, S. and Kumar, R., I.E.E.C. Proc. Des. and Dev., 22, 1983, 280):

$$\Delta T = \frac{qy°}{C_{pg}(1 - \psi)} \quad (1)$$

$$\text{where, } \psi = \frac{C_{ps} y°}{C_{pg} n°} \quad (2)$$

q is the heat of water adsorption, y° is the mole fraction of water in feed gas, n° is the equilibrium capacity at the feed conditions, $C_{pg}$ is the gas phase heat capacity and $C_{ps}$ is the solid phase heat capacity.

The velocity of this front is given by:

$$\beta = \frac{Q° C_{pg}}{\rho_b C_{ps}} \quad (3)$$

where $\rho_b$ is the bulk density of the absorbent and $Q°$ is the feed flow rate.

For water-zeolite sorption, from air saturated at 100 psia and 100° F. the temperature rise, $\Delta T$ is $\sim 45°$ F. The thermal front moves at a velocity of $\beta \sim 0.50$ ft/min for $Q° \sim 45$ lbmole/hr/ft$^2$. Therefore, in a TSA or PSA process employing only zeolite for both water and carbon dioxide removal the adsorbent in front of the water section will be at $T \sim 145°$ F. Since carbon dioxide is removed in the adsorbent following the water section the equilibrium capacity for carbon dioxide is reduced drastically due to its exponential dependence on temperature. This results in a very large carbon dioxide removal section, which causes large void loss and pressure drop in a PSA process and, increases the heat requirement of a TSA process, significantly. This is one of the reasons why conventional TSA and PSA processes such as that described in Jap. Pat. Publ. #55-95079, is operated at $T \sim 40°$ F. ($\Delta T \sim 6°$ F.), and the process of Jap. Pat. Publ. #57-99316 is operated at $P \sim 240$ psia ($\Delta T \sim 15°$ F.). However, all of these processes require more energy than the present invention as discussed above.

On the other hand water-alumina sorption, from air saturated at 100 psia and 100° F., gives a temperature rise of only $\sim 9°$ F. (Chihara, K. and Suzuki, M., J. Chem. Eng. Japan, 16(1), 1983, 53). Therefore, in the present invention alumina is used for water removal, it is then followed by a zeolite for carbon dioxide removal. Since the temperature rise due to water sorption on alumina is minimal, a reasonable size bed may be used for carbon dioxide removal, making this process feasible and more efficient than any of the current processes. Energy reductions of $\sim 34$–$45\%$ are observed.

The present invention reduces the energy requirement for removing water and carbon dioxide from air by operating the process close to ambient temperature, and then regenerating the adsorbent by purge gas at the same temperature. This operating temperature is feasible since the suggested process employs alumina for water removal followed by a zeolite for carbon dioxide removal. The process described in Jap. Pat. Pub. #57-99316 is operated at or above ambient temperature. This process, however, consumes more energy and capital than the present invention since it adsorbs at $P \sim 240$ psia and desorbs under vacuum by purge. The compressor size, compression energy and void losses will be significantly more than the present invention. It will also require a vacuum train.

What is claimed:

1. The method of removing moisture and carbon dioxide from atmospheric air which comprises the steps of:
   (a) passing the air at an inlet temperature in the range of about 70°–120° F. and at an inlet pressure in the range of about 50 to 150 psia through a first bed of adsorbent selective in removal of water from an air stream and then through a second bed of adsorbent effective in selective removal of carbon dioxide; then regenerating said first and second adsorbent beds by
   (b) reducing the pressure in said beds by gas withdrawal therefrom in a direction opposite that of step (a) to about atmospheric pressure level;
   (c) and at the attained pressure level of step (b) purging both said beds with a gas stream freed of water and carbon dioxide, said gas stream being introduced into and passed through said second bed into and through said first bed; followed by
   (d) repressuring both said beds to a level in the range of 50–150 psia with product gas freed of water and carbon dioxide, passed into said beds in the same flow direction as step (c).

2. The method as defined in claim 1 wherein said first bed adsorbent is alumina.

3. The method as defined in claim 2 wherein said second bed adsorbent is a molecular sieve zeolite.

4. The method as defined in claim 1 wherein said first and second adsorbent beds comprise separate layers in a single adsorption column.

5. The method as defined in claim 1 wherein said first and second adsorbent beds are contained respectively in separate columns in direct gas flow communication.

6. The method as defined in claim 1 wherein the total time occupied during steps (b), (c) and (d) is that equal to the time period of step (a).

7. The method as defined in claim 1 wherein the entire sequence of steps (a) through (d) are carried out at close to the same temperature.

* * * * *